United States Patent
Grasteit

(10) Patent No.: US 7,428,525 B1
(45) Date of Patent: Sep. 23, 2008

(54) VIRTUAL STREET ADDRESSING RADIUS

(75) Inventor: Christopher T. Grasteit, San Francisco, CA (US)

(73) Assignee: Tele Atlas North America, Inc., Lebanon, NH (US)

( * ) Notice: Subject to any disclaimer, the term of this patent is extended or adjusted under 35 U.S.C. 154(b) by 0 days.

(21) Appl. No.: 09/439,550

(22) Filed: Nov. 12, 1999

(51) Int. Cl.
*G06F 7/00* (2006.01)
*G01C 21/30* (2006.01)

(52) U.S. Cl. .............. 707/3; 707/6; 707/10; 707/104.1; 701/208

(58) Field of Classification Search .............. 707/3, 707/4–7, 10, 104.1, 1; 709/217, 207; 701/207–208; 705/10, 62; 702/3
See application file for complete search history.

(56) References Cited

U.S. PATENT DOCUMENTS

| | | | |
|---|---|---|---|
| 5,031,093 A | 7/1991 | Haegawa | 364/200 |
| 5,098,683 A | 3/1992 | Mehrotra et al. | 423/266 |
| 5,170,353 A | 12/1992 | Verstraete | 364/444 |
| 5,276,768 A | 1/1994 | Bander | 395/10 |
| 5,285,391 A | 2/1994 | Smith, Jr. et al. | 364/443 |
| 5,452,294 A | 9/1995 | Natarajan | 370/54 |
| 5,470,233 A * | 11/1995 | Fruchterman et al. | 434/112 |
| 5,486,822 A | 1/1996 | Tenmoku et al. | 340/995 |
| 5,487,139 A | 1/1996 | Saylor et al. | 345/629 |
| 5,495,479 A | 2/1996 | Galaand et al. | 370/60 |
| 5,774,362 A | 6/1998 | Suzuki et al. | 364/443 |
| 5,845,228 A | 12/1998 | Uekawa et al. | 701/209 |
| 5,848,373 A | 12/1998 | DeLorme et al. | 701/200 |
| 5,893,081 A | 4/1999 | Poppen | 705/400 |
| 5,916,299 A | 6/1999 | Poppen | 702/202 |
| 5,938,726 A | 8/1999 | Reber et al. | 709/217 |
| 5,946,687 A * | 8/1999 | Gehani et al. | 707/10 |
| 5,966,135 A * | 10/1999 | Roy et al. | 345/619 |
| 5,978,730 A | 11/1999 | Poppen et al. | 701/202 |

(Continued)

FOREIGN PATENT DOCUMENTS

EP     0509839 A2 *   4/1992

(Continued)

OTHER PUBLICATIONS

MapInfo Corporation; "MapMarker 4.4.0 Plus Support Notes"; Feb. 1999; pp. 1-11.*

(Continued)

*Primary Examiner*—Ella Colbert
(74) *Attorney, Agent, or Firm*—Fliesler Meyer LLP

(57) ABSTRACT

A single geocoded data layer is created by converting centroid related data to a line by adding or subtracting a distance at a predetermined direction from the centroid to derive an endpoint from the centroid defining the line (taking the form of a radial extending from the centroid). The source of the centroid related data is utilized to determine the direction of the line. The single geocoded data layer allows for one pass searching of geocoded data, and provides a display with more information than a simple match to a point or centroid. The radial display may take any form. Unconfirmed locations in the database may be related only to a centroid, and a display program automatically calculates a radial for display in conjunction with the centroid. The display may be the form of a radial, a radial with notches (representing additional matches), colors, or other shapes, etc.

14 Claims, 12 Drawing Sheets

U.S. PATENT DOCUMENTS

| | | | | |
|---|---|---|---|---|
| 5,995,105 | A | 11/1999 | Reber et al. | 345/356 |
| 6,016,485 | A | 1/2000 | Amakawa et al. | 705/400 |
| 6,038,509 | A | 3/2000 | Poppen et al. | 701/210 |
| 6,101,496 | A * | 8/2000 | Esposito | 707/6 |
| 6,202,023 | B1 * | 3/2001 | Hancock et al. | 701/201 |
| 6,266,612 | B1 * | 7/2001 | Dussell et al. | 701/207 |
| 6,366,851 | B1 * | 4/2002 | Chojnacki et al. | 701/208 |

FOREIGN PATENT DOCUMENTS

| | | |
|---|---|---|
| EP | 0679867 | 11/1995 |
| EP | 0803708 | 10/1997 |
| EP | 0854353 | 7/1998 |
| WO | WO 9824034 | 6/1998 |

OTHER PUBLICATIONS

Oracle: Enabling the Information Age; "Oracle8i interMedia Locator User's Guide and Reference release 8.1.5"; Feb. 1999 pp. 1-1-1-4 and 2-1-2-20.*

Reed, David; Marketing Week; "Location reports"; Proquest ; Jul. 16, 1998; vol. 21; Iss. 20; pp. 51-54.*

"Geocoding 101; ArcView"; wysiwyg://45/http//gislounge.com/features/aa053100a.s; 1999-2005; pp. 1-6.*

*Common Addressing Matching and Geocoding Terms*, http://www.geocode.com/geocode.html, May 6, 1999.

*GeoAccess-Geocoding Techniques*, http://www.geoaccess.com/datamanagement/geocoding-techniques.html, May 6, 1999.

*GeoAccess-Geocoder*, http://www.geoaccess.com/datamanagement/geocoder.html, May 20, 1999.

*Home Page*, http://www.hsv.tis.net/~wintrak, Jun. 14, 1999.

*Gallery*, http://www.hsv.tis.net/~wintrak/gallery.html, Apr. 12, 1998.

*MapsOnUs: A Map, Route and Yellow Pages Service*, http://www.mapsonus.com, Sep. 10, 2002.

*Mapquest:Home*, http://www.mapquest.com, Sep. 10, 2002.

* cited by examiner

The Address Was Not Found.
The Following Was Found: SAN FRANCISCO, CA 94111

VIRTUAL STREET ADDRESSING RADIUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates to the display of information. The invention is further related to the display of detailed addressing or location information of objects placed on a map, chart, graph or other display types. The invention is more particularly related to the display of zip code, proximity, or radius data for locations not precisely identified on a map. The invention is also related to geocoding point data as line information in a single layer geocoded database. The invention is still further related to the display of geocoded point data as one or more lines (radials) emanating from a centroid formed from an endpoint placed in a predetermined direction from the centroid.

2. Discussion of Background

Maps and methods of displaying information are utilized in many devices. Maps, for finding locations of cities, houses, or other destinations generally display routes and points or shaded areas designating populated areas, cities, states, parks, points of interest, etc. Additional information about cities or roads may be printed on the map in close proximity to the designation (Cleveland, pop. 2,300,000, for example). Such information may also be printed as an index at a bottom or reverse side of the map (an index of streets or cities, along with a grid identifier, G-3, for example).

Some Internet applications using mapping data (directed graphs, for example) have been adapted for display of any of selected areas or for finding address locations and driving directions. For example, on-line maps and driving directions are available at mapsonus.com. Mapsonus provides on-line users with an opportunity to input an address and retrieve an electronic map displayed on their screen.

Methods of displaying information include driving maps (like mapsonus) and various tracking devices, including satellite tracking. Satellite tracking software is available over the Internet and includes examples such as WinTrak at hsv.tis-.net/~wintrak/. Satellite tracking programs typically utilize an input file having orbital elements describing an orbit of a satellite and output a spherical display or flat map of the earth along with a track (route) of the satellite(s) described by the orbital elements. Other information about the satellites are typically printed at a bottom area of the satellite tracking display, shown in a pop-up window, or accessed via another screen (activated by a control key sequence or a pull down menu, for example).

Additional information on traditional maps is typically available, but fixed (not updatable without purchasing a new map), and often buried in tables or other indexes not necessarily linked to any of the items they describe. Internet based maps and other computer program or Internet displays (satellite tracking software, for example) are typically too crammed with general area and background information (e.g., routes, paths, street names, etc.) to display additional information on the maps themselves.

Electronic or software based maps are typically based on mapping information stored in a database. The maps themselves are not stored, but information to create the maps is stored in a computer readable format, typically a directed graph. A directed graph stores nodes and edges connected into a graph that is utilized for route searching and planning. A more complete description of directed graphs can be found in Suranyi, U.S. Pat. No. 6,885,937 entitled "SHORTCUT GENERATOR." issued Apr. 26, 2005, incorporated herein by reference, in its entirety. Directed graphs are useful for determining routing and cost information for travel between points in the graph.

Geocoding, also known as location coding, assigns a position (usually latitude and longitude coordinates) to street addresses. Auxiliary information, such as the precision and source of the latitude and longitude coordinates may also be included in the geocoded information.

Generally, the geocoded information (addresses, latitude/longitude (lat/long) for that address, and additional precision information is maintained in a database. Typically a geocoded database includes lat/long information for street segments or lines maintained in the database. Address information is searched against the database to find a corresponding street segment. Based on an address range of the corresponding street segment, a position of the address is determined (for example, a street segment having an address range of 101-200, is correlated to an address of 176, which has a position of 76% of the distance from 101 to 200 in the segment). Lat/long is interpolated based on the position of the address with respect to record information maintained about the corresponding street segment. Table 1 provides an example of one possible result of a search of five addresses against a geocoded database.

TABLE 1

| | Search Criteria | | | Search Results | |
| --- | --- | --- | --- | --- | --- |
| Street | No. | Name | Cty/State | Lat | Long |
| Post Street | 100 | Corner Market | San Fran, CA | 117.52 W | 38.621 N |
| Post Street | 876 | Louie Market | San Fran, CA | 117.53 W | 38.621 N |
| Albertly Ave | 356 | Poland | Parma, OH | 105.17 W | 42.522 N |
| Park Ave | 1200 | Apartment | New York City, NY | 103.44 W | 43.198 N |
| Miramar Rd | 3600 | Malibu RaceTk | San Diego, CA | 116.54 W | 37.233 N |

As can be seen by Table 1, the geocoded database search returns location information (lat/long coordinates) matched to address, name, and city/state. The geocoding process itself is the placement (or linking) of the addressing or other info in the database in correlation with a location (lat/long). This linking may be done in a database which stores one lat/long or location for each address. However, it is more efficient to link address to locations (lat/long) by interpolating the address position based on a known location (location of a segment for example) as discussed in the above example.

Searching a geocoded database for matches commonly involves use of two or more distinct data layers in order to get a high match rate. Typically, a first layer consists of lines or streets. Second and additional layers are typically composed of centroids that represent a common feature of a larger area. Often centroids will represent a set of address ranges, perhaps matching different data source types (zip codes, or population centers, for example). When locations, addresses, or other points are not precisely located on a map or graph (i.e., not found in a search of the first layer—lines or streets), they are then searched against the second or subsequent layers and matched against a centroid that matches a broader characterization of the point being searched. For example, when a specific address is not found in the lines and streets of layer 1, a zip code of the address is matched against zip code centroids of layer 2. If a zip centroid matches the address, a location of the matching zip centroid is returned as a match.

However, several problems arise with searches of geocoded databases. First, a program searching the database is required to access and use multiple data layers. The data layers are separately maintained and a pass on each data layer is needed for all data to be considered in the search. After a first pass, any records that fail to make a match are passed on and searched against the next data layer and so on. Combining tasks in an automated fashion, requires additional computational tasks, is slower, making interactive geocoding more difficult.

Another problem associated with prior geocoding techniques is that multiple geocode matches to a same geographic centroid location, even if the matches are of different source types or different types of information are anchored to a same location (a default address, population center, or zip code centroid, for example). Because the centroid is a point in the database, each match collapses onto the same location (each match having a same zip code, for example).

Referring to FIG. 1, there is illustrated one example of a map 100 that has been geocoded with street addresses 1-8 110, correlating a location on the map to known street addresses, and using a centroid 140 for identification of unregistered or unknown address locations. Locations 1 and 2 (representing 112 and 182 Main St., respectively) are shown at their respective geocoded locations on Main St. 120. Location 4 (representing 254 $1^{st}$ St.) is shown at its geocoded location on $1^{st}$ St. 130. However, addresses 3, and 5-8 corresponding to Rhubarb St., Flower St., $19^{th}$ Ave., and Blossom Dr. do not have exact geocoded locations and are placed at the centroid 140. Identification of matches for addresses 3, and 5-8 all collapse onto the centroid 140 and fail to provide any additional information about the addresses.

Another example is shown in FIGS. 2A and 2B. In FIG. 2A, a mapquest query is performed on 852 Nothere St., identified in the query as part of San Francisco, Calif., 94111. Since 852 Nothere St. was not found in the mapquest database, an identifier 210 was placed on a map 200 of San Francisco's 94111 zip code (at a zip code based centroid or other anchor point of the 94111 zip code). In FIG. 2B, a mapquest query on 852 SamePlace Ave., also identified in the query as part of San Francisco, Calif., 94111. Since 852 SamePlace Ave. was not found in the mapquest database, an identifier 220 was placed at a same location on the map 200 as identifier 210 (at a same zip code based centroid or anchor point of the 94111 zip code). FIG. 2C provides a comparison of an exact match 230 made on an address found in the mapquest database. Additional information about the matches is not displayed on the map 200, but some additional information is shown in the query box 250 and info bar 260.

SUMMARY OF THE INVENTION

The present invention provides additional information via a radial display of an object represented on a map or other display devices. One implementation uses a radial display to identify a precision of an approximated location displayed on a map. The precision indicated by the radial display can be of any denomination, but, a radial display providing an identification of a zip+precision (a form of postal coding) is considered highly valuable for such approximations. Other than precision information, any other descriptive or other data regarding a location being identified may be conveyed via the radial display, including any of facilities, number of visitors per year, net worth, or other information that might be useful to a user of locations being displayed.

The radials allow multiple matches to a single centroid to be visible. The multiple matches are displayed on different radials or via notches, flags, or other icons attached to the radials.

The present invention applies to other mapping situations, one example being satellite tracking maps. Information portrayed by a radial or other display may include an altitude, size, type, available fuel, velocity, age, or any other data about the satellite.

The present invention also combines different database layers by representing centroid (or other anchor points representing a category of items) points in a database as a line, therefore database users need only search a single layer to match known locations or centroid locations in the database. A line representing the centroid points also facilitates display, and thereby enhance recognition of a display representing locations and other data on a map. The line may form a radial extending from a centroid or other anchor point where several items may be identified. Different types of items may be shown on different radials, allowing additional information, etc to be displayed about multiple objects or locations present at the centroid or other anchor point.

The present invention includes loading all data (street segments, centroids, anchor points, etc.) into a single layer geocoded database, and performing geocoding (searches of the geocoded database) with a single pass of the database. Similar data contained within an address range are geocoded onto a same line (instead of a point or centroid) which allows for multiple matches to a single point or centroid to be visible. Different data sources are also encoded onto lines, but of a different direction, therefore providing visibility of multiple matches at a same point or centroid, and providing distinction between matches of a different type on a same or similarly located centroid.

The present invention includes a radial display of an object representing an approximated location of an item or feature on a map or other display device. The present invention includes a method for searching a single layer database, comprising the steps of identifying an anchor point; defining at least one radial extending from said anchor point; and associating at least one item relating to said anchor point with said radials; and a method of searching a one layer database including the steps of searching a data layer for matches to a set of at least one searching criteria; displaying data layer matches having confirmed locations on a display grid; and extending a radial from an anchor point associated with a search criteria not matched in said searching step.

The present invention includes building a database, including the steps of loading data items having known and unknown locations into said database; location coding each of said data items having known locations; associating each of said items having unknown locations with a line representing the unknown location.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
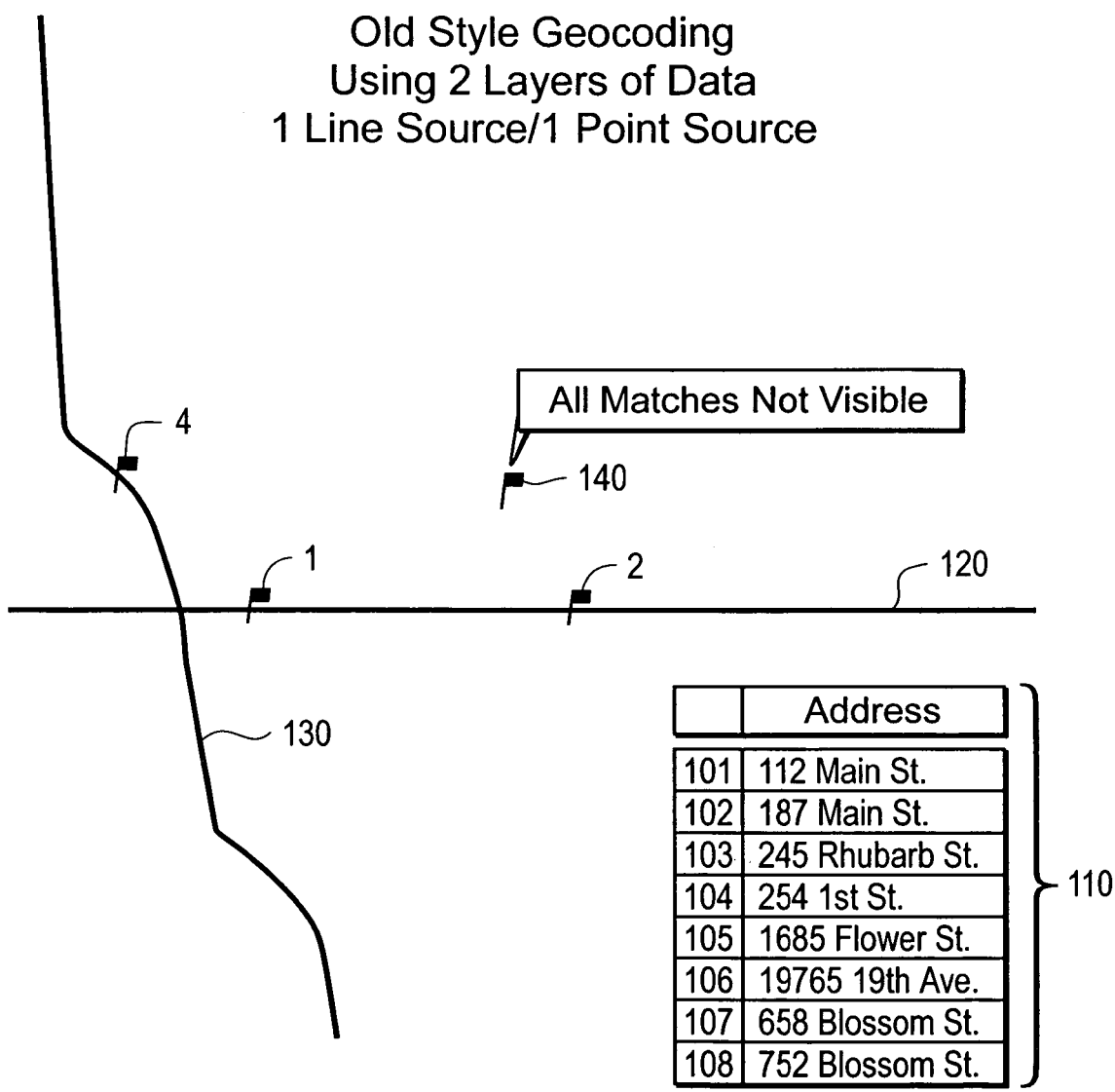
FIG. 1 is an illustration of a prior art map system displaying map database matches at locations associated with each match, including exact locations and a centroid associated with matches not having exact locations.
Figure 2A:
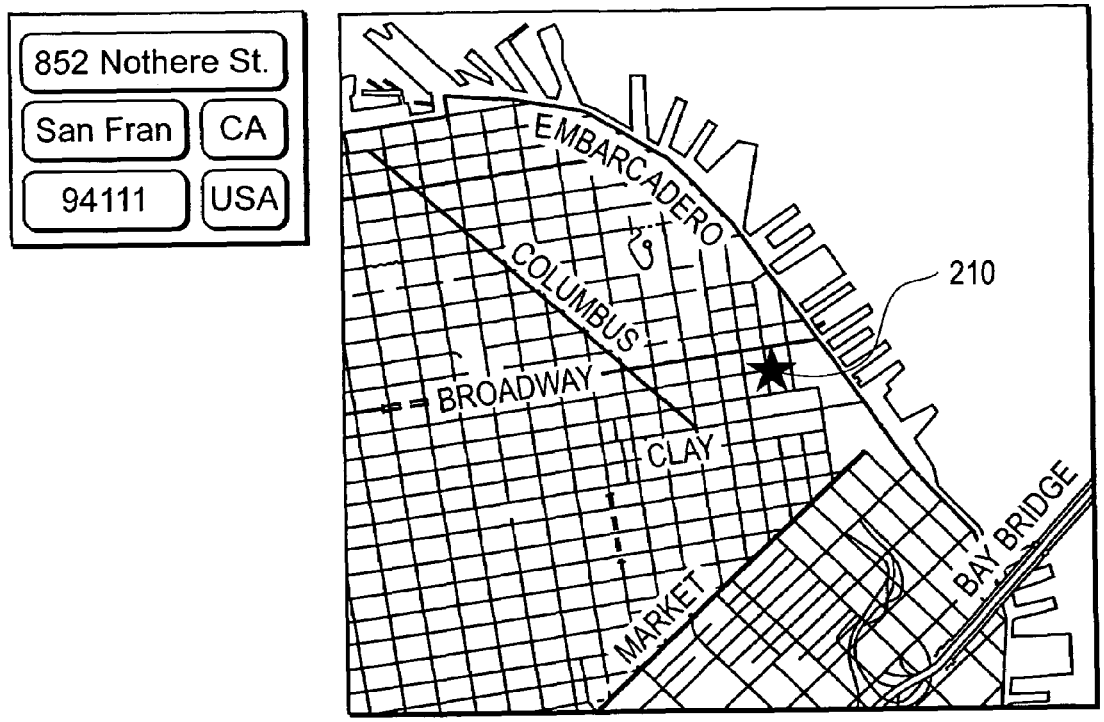
FIG. 2A is an example of a commercially available mapping service that matches input addresses to a map, matching an address not found in the service's database to a centroid.
Figure 2B:
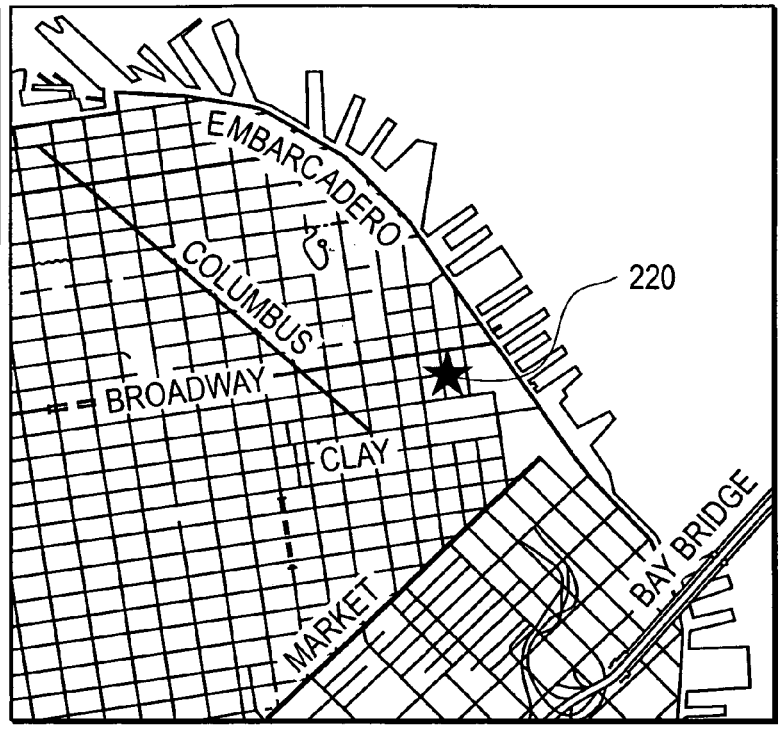
FIG. 2B is another example of a commercially available mapping service, matching an address not found in the service's database to a centroid.
Figure 2C:
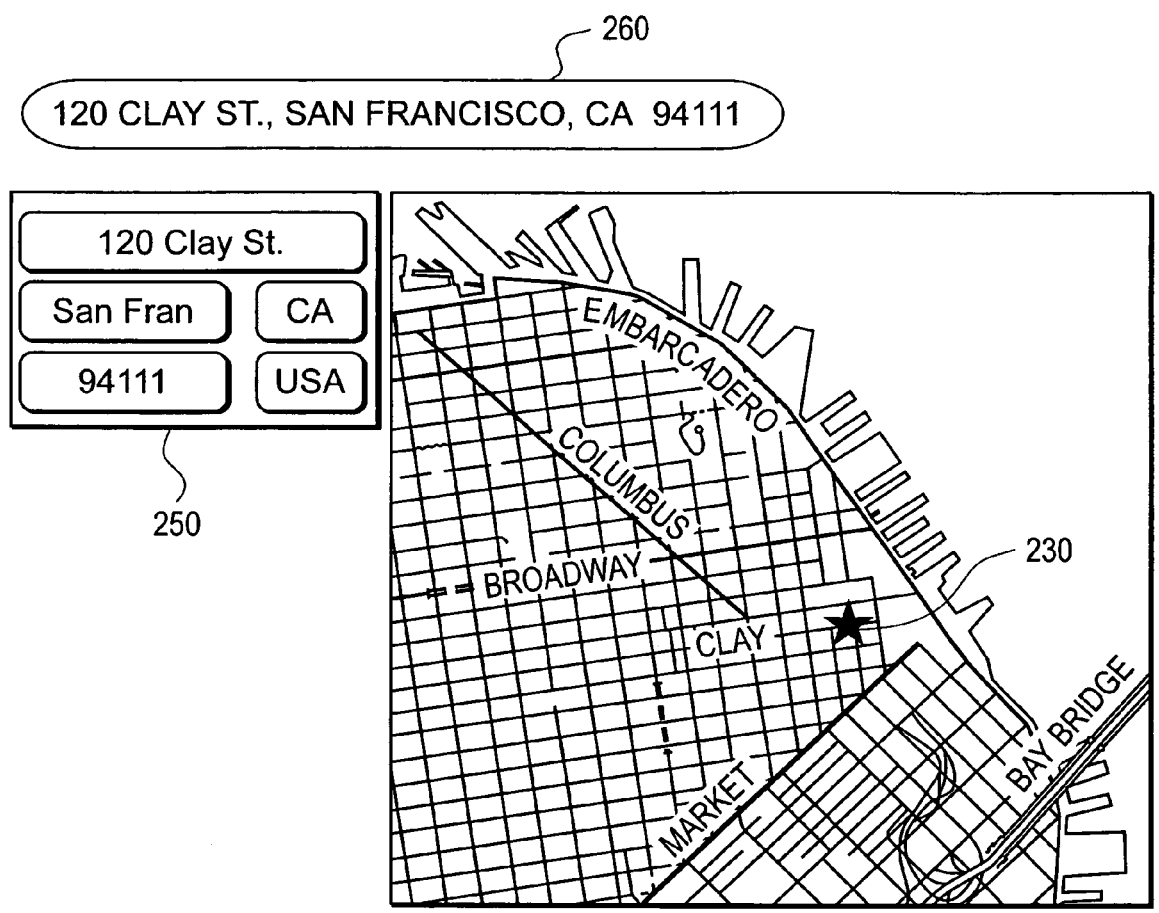
FIG. 2C is another example of a commercially available mapping service, matching an address not found in the service's database to a centroid.

Referring again to the drawings, wherein like reference numerals designate identical or corresponding parts, and more particularly to FIG. 1 thereof, there is illustrated one of the problems associated with the prior art, in that geocoded database matches, particularly the matches associated with a single point, such as centroid 140, are not visible in display of those matches. A radial display, having a distinguishing radial arm for each of the matches would provide sufficient information to make each of the matches visible.

Figure 3:
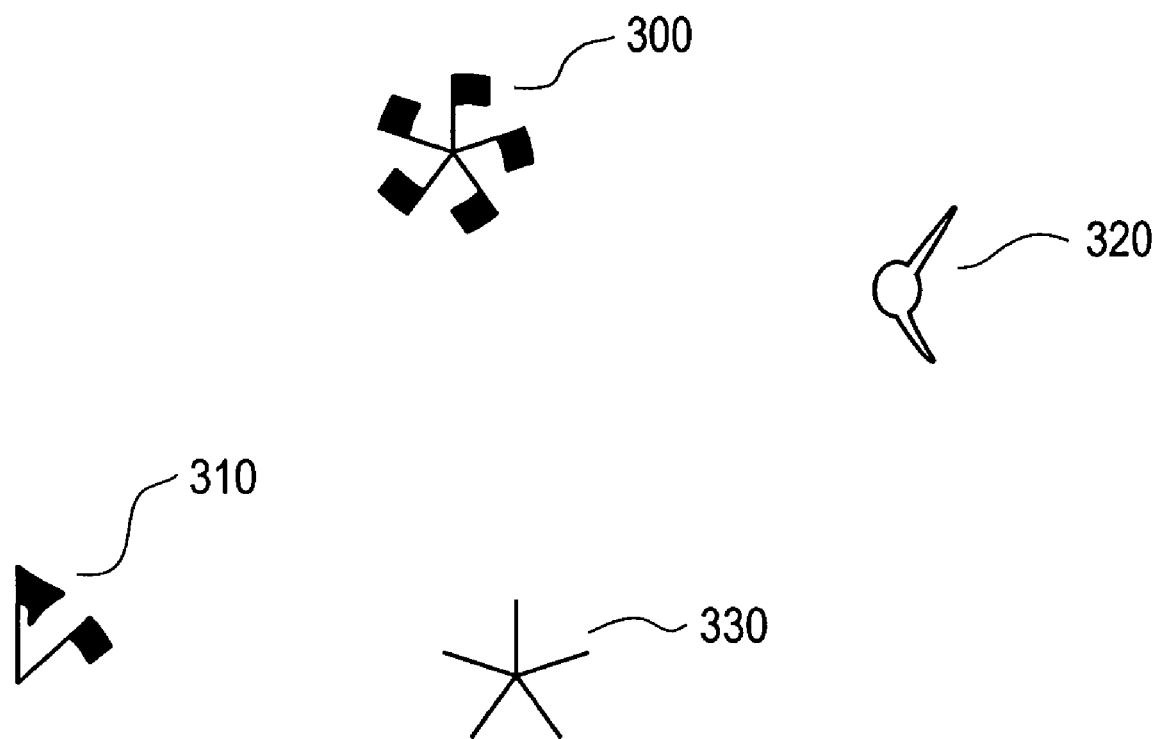
FIG. 3 provides example implementations of radials encoded to convey additional information about matches made to an anchor point.

For example, FIG. 3, provides an illustration of several embodiments of a radial display for providing information about plural matches to a single point. A multi point flag 300 exemplifies a display that, when substituted for the single flag of centroid 140 in FIG. 1, conveys the information that multiple hits (database matches), 5 in total, occurred on the centroid 140. Multi point flag 310, multi point star 320, and radial star 330 each illustrate other possible embodiments (showing 2, 2, and 5 matches, respectively) for displaying a number of hits that occur on a particular point.

It is intended that the radial display be applied to database matches in mapping applications, such as those displaying a number of addresses on a single map display, and to satellite maps (satellite maps having multiple satellites at a same location over a body being orbited, for example), or to convey additional information about a single address or satellite being displayed. However, as will be appreciated by those of ordinary skill in the art, the radial display can be utilized to convey additional information about any item being displayed for any type of system having a graphical display output. In addition, the radial display may take forms other than a radial extending from a center (indentations, flags, crosses, and tones, or hatching may also be utilized, for example).

Figure 4:
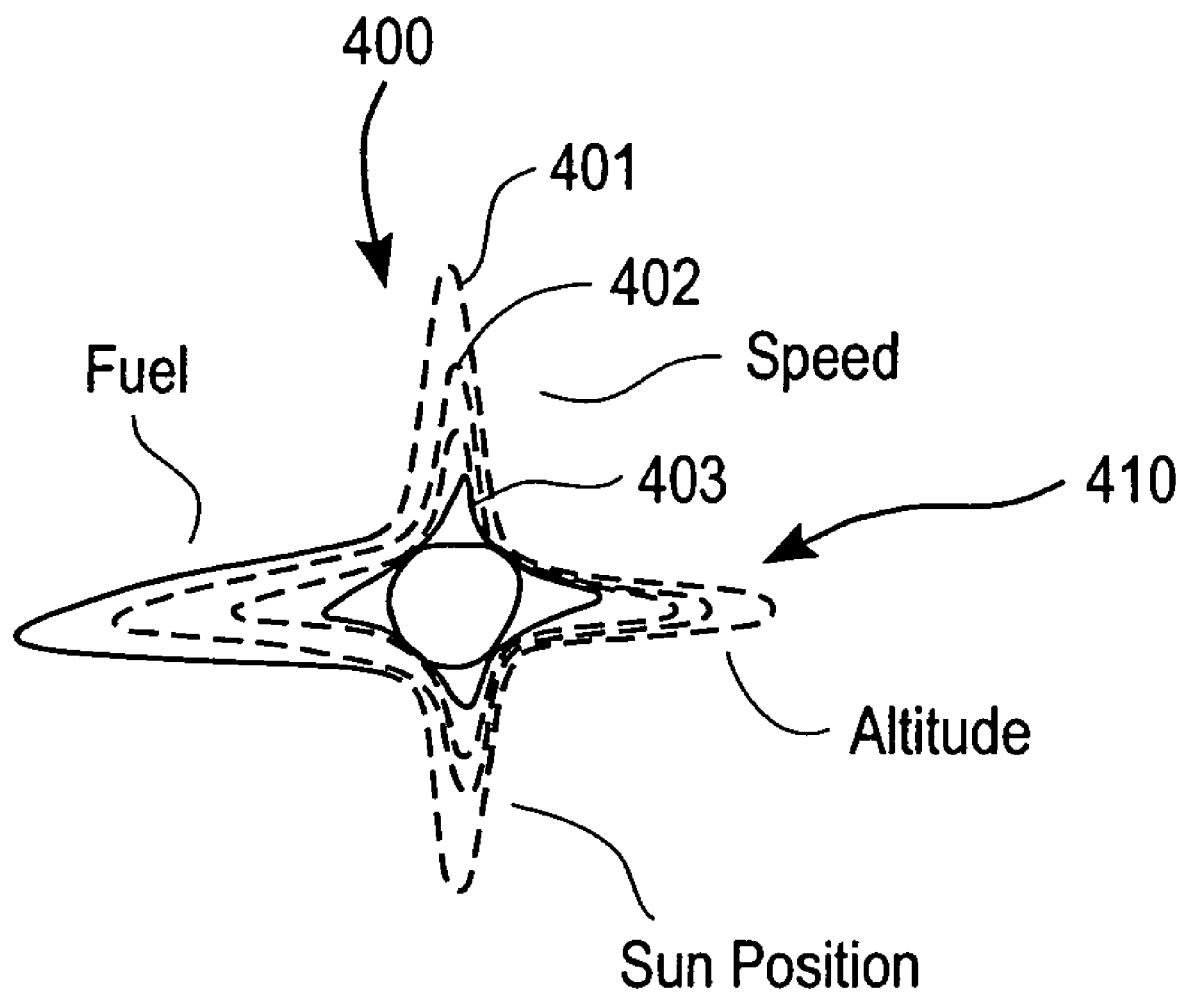
FIG. 4 provides an example of radials encoded to provide additional information about a satellite represented by an anchor point of the radials.

FIG. 4 provides an example of one embodiment providing additional information regarding a single satellite being represented by a radial display. The radial display has a radial 400 having 3 positions, each position representing a speed of the satellite. A first position 401, representing a maximum speed of the satellite (perigee speed, for example), a second position 402, representing an average speed of the satellite (one-half way between apogee and perigee, for example), and a third position 403 (representing a slowest satellite speed (apogee speed, for example). An altitude radial 410 would have a similar 3-tiered system for altitude, corresponding to apogee, perigee, and one-half way a/p for example). A sun position indicator indicates a relative amount of sunlight being collected by solar panels of the satellite, and a fuel radial indicates (4 positions, representing one-quarter fuel increments, for example) an amount of fuel available for maintaining the satellites position. Any number of tiers, shapes, or colors may be applied to the radial display to distinguish these and other pertinent facts or information (other orbital elements, for example) about the satellite being displayed.

Figure 5:
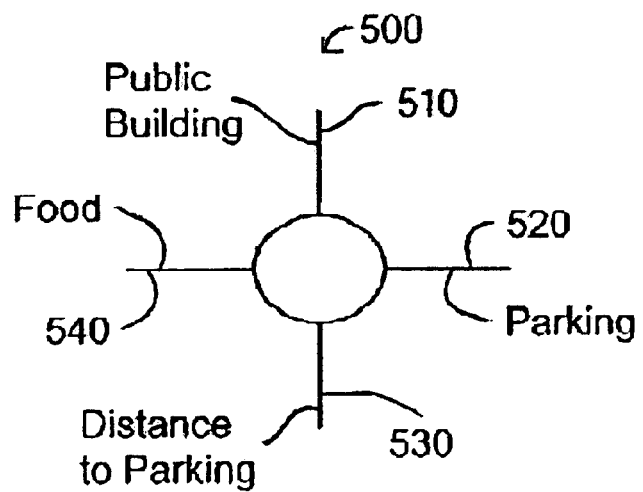
FIG. 5 provides an example of radials encoded to provide additional information about an address identified at an anchor point.

FIG. 5 illustrates a radial display for one embodiment of a mapping device that identifies buildings and other establishments on a map. The radial display 500 includes 4 radials, radial 510 representing a type of building, radial 520 representing the availability of parking, radial 530 representing a distance to parking, and radial 540 representing food availability at the establishment being represented. Any types of information associated with a location, address, or establishment can be represented and displayed by an individual or set of radials (type of building, parking, and food being examples).

A length of the radials represents whether or not such services are present, or how far away such services are. Alternatively, a shape of the radial may convey the information. For example, flags pointing different directions for public or private building, locale of parking, for example, are illustrated in FIG. 5.

The present invention is implemented in a single pass geocoded database. The database is single pass because all data is loaded into 1 data layer (i.e., all data sources reside in a single data layer). This is done by creating a pattern or alignment of a line representing a data source. From a given originating point (anchor point, or centroid, for example, an anchor point being any point on a map, and envisioned to represent multiple locations or all locations within a geographic area) a mathematically short variance in a predetermined direction is made to set an end point for a new line. The predetermined direction may be arbitrary or based on information to be conveyed about a match to the new line (for example, a 45° radial might indicate a zip+4 precision). The new line is stored in the geocoded database. The database may include a directed graph or any other type of data storage capable of representing or identifying the line.

For different types of data associated with a same geographic location, a series of lines radiating from the originating centroid, each representing a particular feature, quantity, or location match associated with the originating centroid.

The number of lines radiating from the originating centroid, would depend on a number of such features being mapped to the originating centroid.

Figure 6:
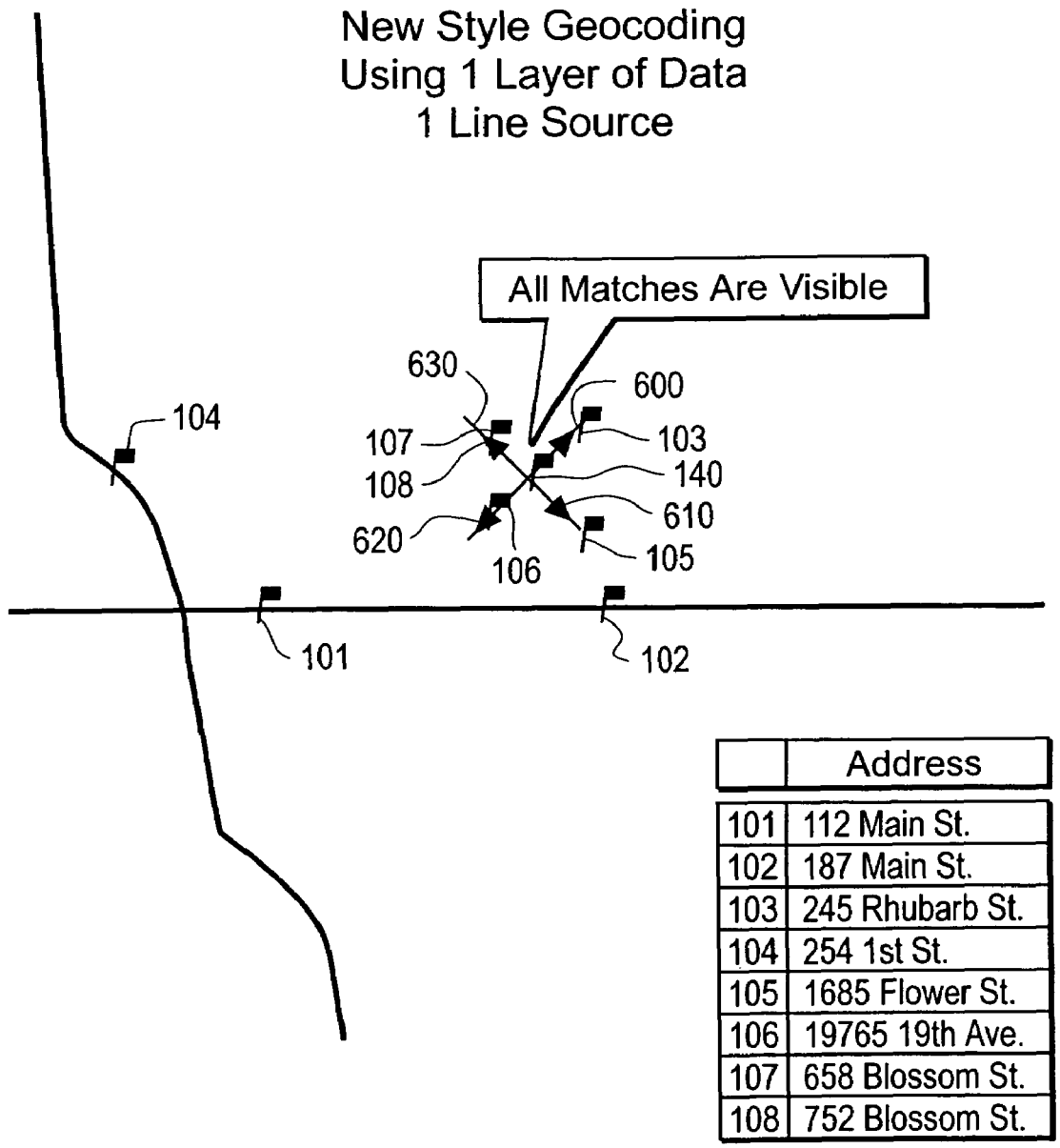
FIG. 6 illustrates a display from a database geocoded so that unconfirmed addresses are placed on a centroid based radial encoded as a line in the database.

FIG. 6 illustrates similar address locations of FIG. 1, displayed according to the present invention, after having been encoded into a database and associated with radials emanating from a centroid matching each of the addresses having unidentified locations. The centroid 140 is shown having radials 600, 610, 620 and 630. In this embodiment, each radial corresponds to an unknown street.

Radials cal also represent unknown addresses or a set of unknown addresses of a known street. The present invention includes an interpolation of unknown address values to approximate positions on known streets.

Radial 600 corresponds to Rhubarb St., radial 610 corresponding to Flower St., radial 620 corresponding to 19$^{th}$ Avenue, and radial 630 corresponding to Blossom Dr. Similar to FIG. 1, exact locations of addresses 103, and 105 . . . 108 are unknown. Unlike FIG. 1, the matches are made to a line (radials 600, 610, 620, 630) associated with centroid 140, instead of the centroid alone. Note that radial 630 (Blossom Dr.) has two points (addresses) 107 and 108 notched thereon indicating the two Blossom Drive addresses not specifically identified in the database.

In this embodiment, each street or address range of a street not specifically identified as to location in the database is associated with a nearest ascertainable centroid, and placed on a radial identifying the street or address range. As more streets are added to the database without specific location information, more radials are produced to match the unidentified locations.

Table 2 illustrates a database table having the addresses of FIG. 6 with the unknown locations geocoded to radials extending from a centroid (116/35) associated with the addresses of each unknown locations. Each address is associated with a Latitude (Lat.) and Longitude (Long.) (Lat/Long). The Lat/Long for each address is either a specific identified location of the address, or a location of a centroid associated with the address. In this example embodiment, a centroid Lat/Long is identified by association with a radial. Radials 45, 135, 225, and 315 are shown in table 2 and indicate a direction (in degrees, for example) from the centroid of which the radial extends.

TABLE 2

| Address | Lat. | Long. | Radial |
|---------|------|-------|--------|
| 112 Main | 116.5 W | 34.85 | |
| 245 Rhubarb | 116 | 35 | 45 |
| 254 1st | 116.6 W | 35.01 | |
| 1685 Flower | 116 | 35 | 135 |
| 19761 19th | 116 | 35 | 225 |
| 638 Blossom | 116 | 35 | 315 |
| 732 Blossom | 116 | 35 | 315 |

In the display, points identifying each address associated with a radial (point 107, in FIG. 6, for example) are placed at an interpolated position along the associated radial, thus conveying additional information based on the interpolated position. Once a location and a radial are identified, interpolation for positioning the point on the radial can be performed based on any quantifiable piece of data. In this example embodiment, the interpolated position is based on a range of addresses for the street associated with a radial (if available). Alternatively, such interpolation may be based on, for example, a type of data (type of building, address, or other features), and an accuracy of the centroid relating to the radial.

Table 3 is an example table within a database that tracks address ranges associated with each radial. The radials are identified in column 1, and an address range for that radial is recorded in column 2. Using this table and address of 125 associated with radial 45 would be placed at a point one-half way between endpoints of the radial because 125 is one-half of the address range represented by the 45 radial. The address ranges may be based on all unknown addresses identified or via other parameter stored in the database. Table 3 approximates the radials and address ranges illustrated in FIG. 6.

TABLE 3

| Radial | Address Ranges |
|--------|----------------|
| 45 | 1-250 |
| 135 | 1-1700 |
| 225 | 1-40000 |
| 315 | 1-1500 |

In other embodiments, the radials represent factors other than individual streets or addresses having unspecified locations. In one embodiment, the centroids are zip+XX (XX=1, 2, 3, and 4) centroids, and the radials indicate a degree of precision that a radial or points on the radial represent. For example, a point on a 0 degree radial of a zip+2 centroid might indicate the centroid location itself is within 2 blocks of the address associated with the point. In another example, a point on a 270 degree radial of a zip+2 centroid would indicate the point represents a location within 6 blocks of the zip+2 centroid, or an unknown location within the entire zip+2 region.

Table 4 is an example listing of zip+XX classes. A zip+XX class is an indication as to an accuracy of a centroid match with respect to zip code area designations. For example, a zip+4 class match provides a highly accurate position estimate, usually within 2 blocks, a zip+2 class match providing an estimation within 10 city blocks), a zip code class match provides a general area designation, 20 city blocks, or a small town in size, and an a Sectional Center Facility (SCF) class match gives a larger general area designation, providing an approximate position with a state, or perhaps an area overlapping state boundaries.

TABLE 4

| Class | Identification | Example Ranges |
|-------|----------------|----------------|
| New | zip + 4 + 2 (zip + 6) | 94131-2723-99 |
| A | zip + 4 | 94131-2723 |
| B | zip + 2 | 94131-27 |
| C | zip code | 94131 |
| D | SCF | 941 |

Therefore, if a match is made to a centroid within as zip+4 class match, the centroid is very close to the intended address, even though the exact location is not identified (within approximately 2 blocks or less of the actual address).

An additional New class, identified as zip+4+2, provides a very highly accurate position estimate (on the same block), indicating that a zip+4+2 match at a centroid would be nearly an exact match.

Figure 7:
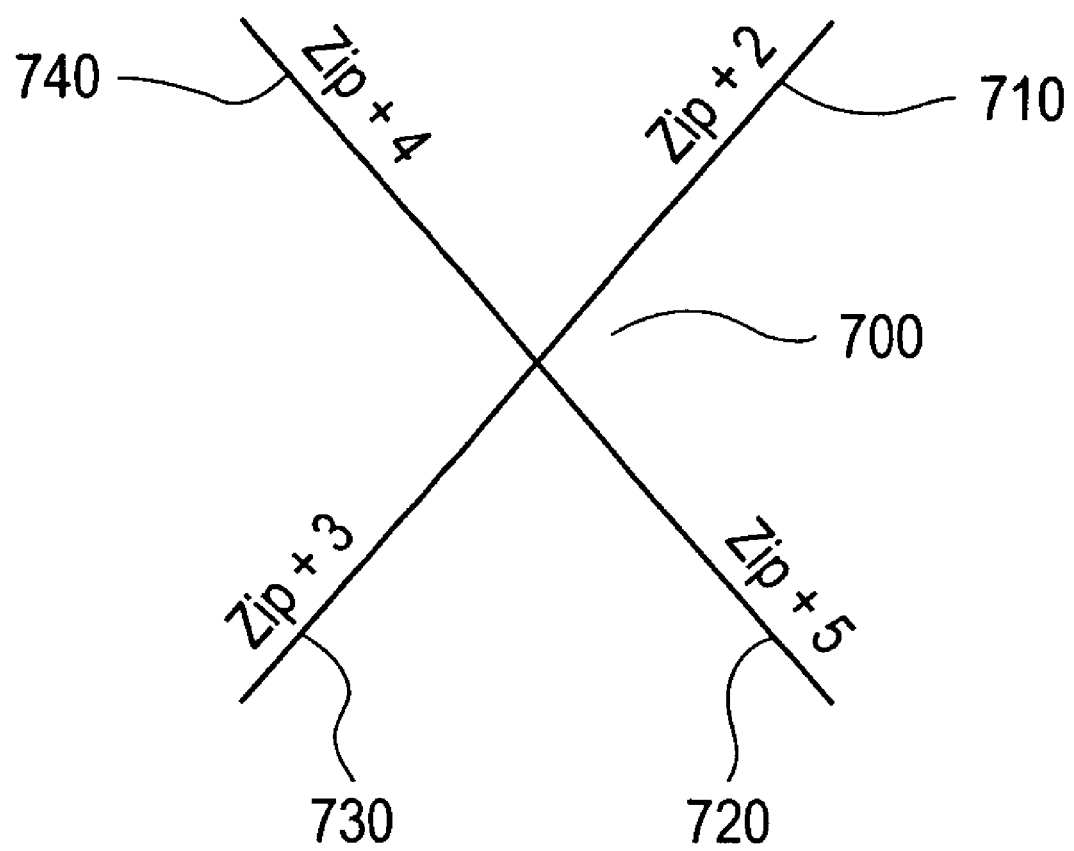
FIG. 7 is an example of geocoded radials representing zip+XX designations, or precision of items matched to a centroid or anchor point.

An example radial display from a geocoded database using radials off a centroid to identify matches and using zip+XX designations to provide accuracy information is illustrated in FIG. 7. A centroid 700 represents an anchor point for unknown matches of an address, location, or mapping database in a specified area (a zip+2 region, for example). Each match without an exact location is identified a radial off the centroid 700. In this example, 4 matches were made without an exact location, resulting in radials 710, 720, 730, and 740. The match associated with radial 710 is a zip+2 match, indicating that the centroid 700 is within a zip+2 area of the match.

In this example, the centroid 700 is itself a zip+2 centroid, but any location, either a centroid based on zip codes, population centers, or other regions (any statistical region, for example), or an arbitrarily selected anchor point can be utilized. Again, as discussed above with respect to other embodiments of the invention, the radials themselves may be of any size, shape, or contain additional designations (flags, or additional notches, indicating additional matches of the same precision or other information about any of the matches, for example).

Figure 8:
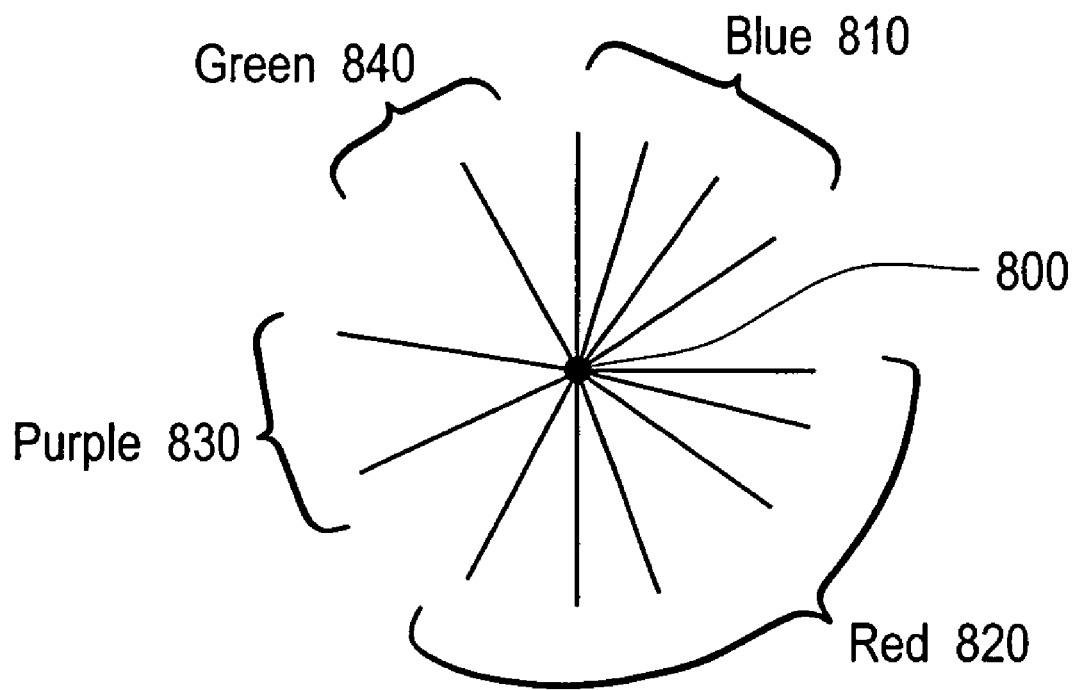
FIG. 8 is an example of a display conveying information about multiple matches to a single anchor point.

Another embodiment of the radial display is illustrated in FIG. 8. Four groupings of radials, blue 810, red 820, purple 830, and green 840, are shown about a point 800. Each of the colors, or groupings of radials, and, possibly each radial convey information about a match made to the point 800.

In the case of addressing, each grouping may represent addresses matched with certain zip code boundaries, similar to the radials of FIG. 7. In this case, each radial might represent a match, and the grouping indicates the precision (zip+4 for blue 810, for example). A database associated with this type of display might, for example identify the centroid, and a program displaying the match would calculate a number of radials to be displayed in each grouping. It is envisioned that groupings of blue radials would be maintained in a same quadrant, or within a contiguous range (0-45 degrees, for example), however, a dispersion of radials might make the program displaying matches simpler to code. In any event, in light of the present disclosure, many different possible combinations of displaying the radials and groupings are possible.

In another example, the point 800 might represent an area above a point on the earth, and each radial might represent satellites orbiting above that point. The blue radials 810 might identify satellites manufactured or controlled by Rockwell. Each of the purple radials 830 might represent satellites controlled by Honeywell. Additional radials within each group could represent additional satellites at a different altitudes over the same point (point 800). The color coded designations can convey information other than manufacture or control (satellite type, for example).

The present invention includes geocoding of unconfirmed location in a database to either a centroid or a line emanating from a centroid (radial). The present invention also distinguishes between unconfirmed locations and bad addresses. A bad address may be identified by any of the information conveying techniques described herein, colors, niches, shape, radial position, etc. For example, an unconfirmed address may be displayed with a green radial or green flag attached to a radial, while a red flag/radial may indicate a bad address.

The present invention may also be applied to indicate equipment installed or attached to a network. For example, a network may consist of three computers connected by ethernet. Each of these computers may have an internal disk drive, modems, or other equipment attached. A map showing a layout at the network could utilize markings according to the present invention to identify the installed equipment.

Figure 10:
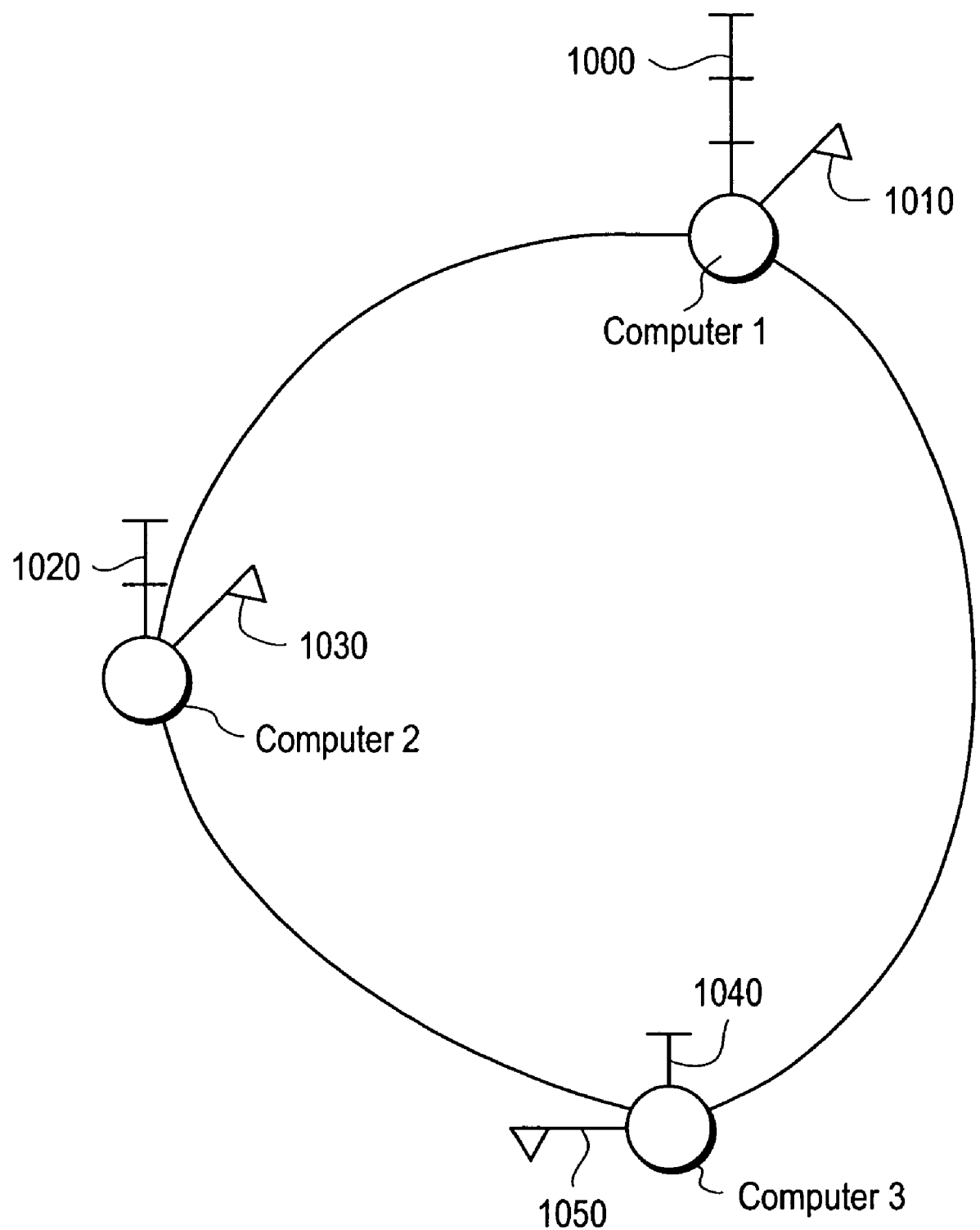
FIG. 10 is an example of a map of a computer network with components identified via radials according to the present invention.

Referring to FIG. 10, a 3 computer network is illustrated, computer 1 has a vertical radial 1000 with 3 notches, indicating the computer has a 3 gig hard drive, and a 45° flag indicating it also has a modem. A vertical radial 1020 with 2 notches on computer 2 indicates a 2 gig hard drive and flag 1030 indicates a modem. Vertical radial 1040 on computer 3 indicates a 1 gig hard drive and 2700 flag indicates that computer 3 is also a gateway to another network (Internet, for example). Any other equipment or features attached to the network may be represented by radials of other sizes, shapes, or directions, providing a clear picture of multiple equipment pieces at each network location.

Figure 9:
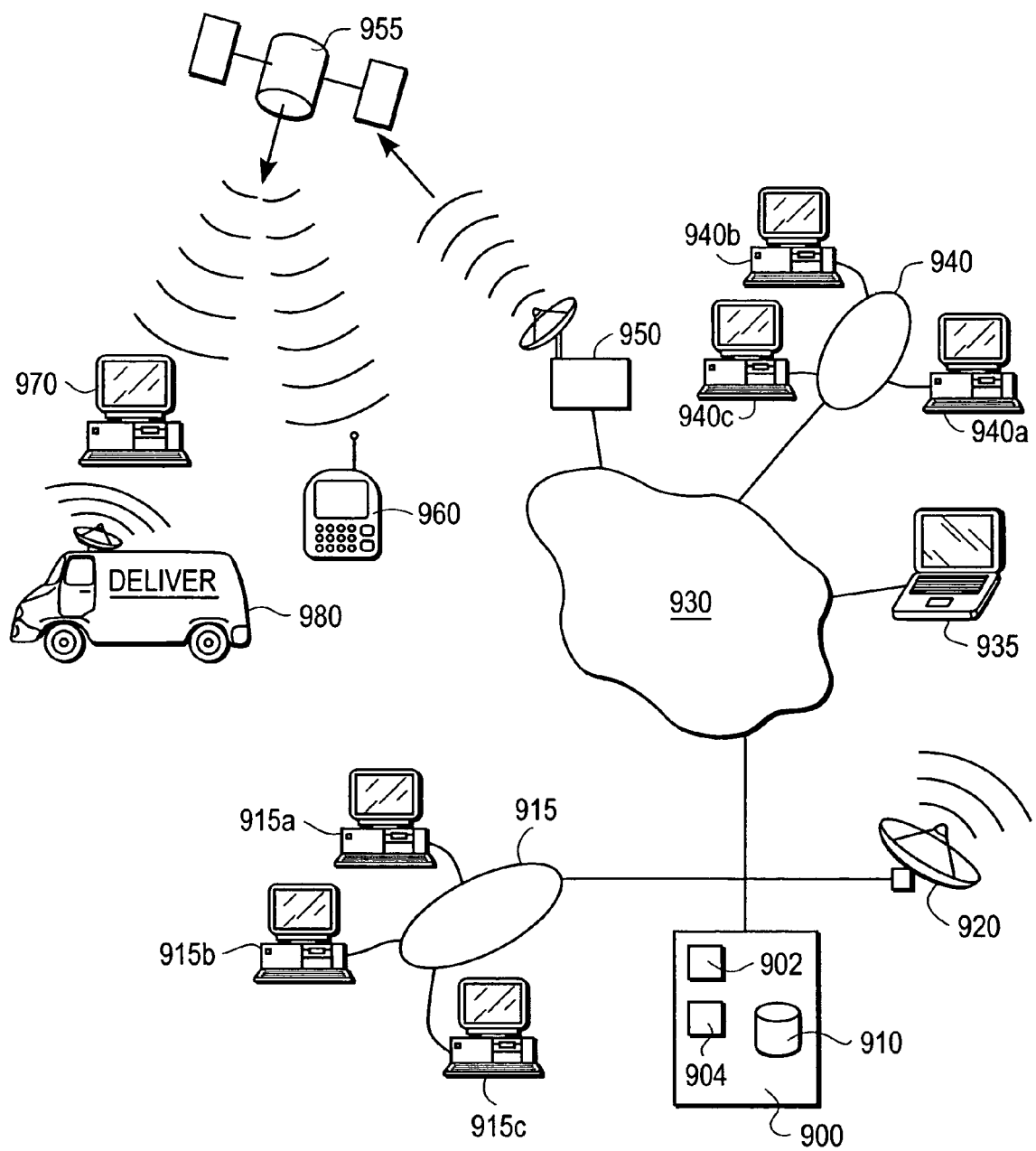
FIG. 9 is an illustration of some example implementations of the present invention.

Based on this disclosure, the present invention may be implemented in many forms. FIG. 9 illustrates some example implementations. A server 900 includes a processing device 902 that receives searching criteria from any of a local i/o device 904, or any of other remote i/o connected devices (palm pilot 960, satellite connected computer 970, Internet computer 935, or networked connected computers 915a-c and 940a-c, for example). The searching criteria may be received, for example, by any of a file communication (ftp, or other downloading mechanism, for example), or response to a query (pop-up dialog box, HTML, VRML, or Java applet downloaded from the server 900, for example).

The server 900 searches a database 910 and formats display data according to the above described processes. The final results are sent to any of the local or remote i/o devices and displayed. The display may include use of other programs or data (Java applets, and cookies, for example) previously downloaded and utilized in further formatting or interpreting the display data sent from server 900.

Each of a network 940, network connected computer 935, and the server 940 may be connected to a larger network 930, which is any of a local area network, wide area network, Intranet, Internet, or other communications mediums (satellite network, for example). Connecting to the network 930, each of these devices would include a connection device (e.g., router, server, standard telephone modem, cable modem, fiber connection, or other devices) to attach and communicate via the network 930.

Remote devices such as palm sized compute 960, deliver van 980, and satellite connected computer 970 include radio frequency (rf), microwave, or other reception devices to allow them to communication with the network 930 (via server/satellite device 950, or directly with the server 900 via satellite device 920, for example). As will be appreciated by those skilled in the art, many varying configurations and combinations of communication and display mechanisms may be applied to practice the present invention based on the teachings contained herein.

The present invention has been described with reference to mapping data matches of addresses, and display of satellite information. However, the type of information that may be represented, displayed, and/or stored in databases based on the teachings contained herein is not limited to addressing matches or satellite data, but may be applied to any type of data.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, matching unconfirmed or unknown address locations to a centroid, identifying and storing precision information related to addressing information, identifying any inventory, features, or components on a network map, displaying radials from an anchor point, each radial representing any of a match or additional information regarding a match, modifying a radial to convey additional information and/or additional matches, calculating radial positions, colors, and other features, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A computer-implemented method for virtual street addressing using a database, comprising:
   identifying in a computer a centroid from the database based on a user input search request;
   defining a plurality of radials extending from said centroid;
   associating at least one data item having an addressable location in the database with each of said plurality of radials as determined from the user input search request; and
   displaying the centroid, the radials and the data items on a map grid.

2. A computer-implemented method for virtual street addressing using a database, comprising:
   identifying in a computer a centroid from the database based on a user input search request;
   defining a plurality of radials extending from said centroid;
   associating at least one data item having an addressable location in the database with each of said plurality of radials as determined from the user input search request;
   locating positions on a respective radial, each said position corresponding to one of the addressable locations;
   generating a marker for each located position of the respective radial; and
   displaying the centroid, the radials, and the markers on a map grid.

3. The computer-implemented method according to claim 2, wherein said marker is any of a point, notch, and icon representation of the associated data item.

4. A computer-implemented method for virtual street addressing, comprising:
   identifying in a computer a centroid based on a user input search request, wherein said identifying a centroid includes:
   identifying said centroid in a database;
   defining a plurality of radials extending from said centroid;
   associating at least one data item having an addressable location with each of said plurality of radials as determined from the user input search request; and
   storing said plurality of radials in the database.

5. The computer-implemented method according to claim 4, wherein said database is a geocoded database of mapping information, and said at least one data item is a location within an area associated with said centroid.

6. The computer-implemented method according to claim 4, wherein said database is a database of satellite information, said centroid represents a position on a globe, and said at least one data item identifies satellites orbiting above an approximate position of said centroid that can transmit information to a receiver located near the centroid.

7. The computer-implemented method according to claim 6, wherein each of the plurality of radials identifies at least one feature of at least one of said satellites.

8. The computer-implemented method according to claim 4, further comprising:
   matching outside data to information associated with said at least one data item; and
   displaying each radial having associated information that matches said outside data.

9. The computer-implemented method according to claim 8, wherein said outside data is location information of data stored in said database.

10. A computer-implemented method for virtual street addressing, comprising:
    identifying in a computer, a centroid based on a user input search request;
    defining a plurality of radials extending from said centroid, wherein the computer defines the plurality of radials by the steps comprising:
    assigning a direction to each respective radial;
    associating at least one data item having an addressable location with each of said plurality of radials as determined from the user input search request;
    calculating an endpoint for each respective radial; and
    defining each respective radial from said centroid to said endpoint of the respective radial.

11. The computer-implemented method according to claim 10, wherein said determining a direction of said radial comprises:
    assigning a direction to each respective radial based on at least one of information and features of the data item associated with the respective radial.

12. The computer-implemented method according to claim 11, wherein said information and features is at least one of a margin of error with which said centroid identifies a location corresponding to said data item.

13. A computer-implemented method for virtual street addressing, comprising:
    identifying in a computer centroids, the centroids provided in given areas of a map accessed by the computer;

defining a plurality of radials extending from each said centroid; and associating at least one data item having an addressable location on the map with each of said plurality of radials, wherein each said at least one data item is a location within one of the given areas associated with said centroid; and displaying the centroid, the plurality of radials, and the at least one data item on the map.

14. The computer-implemented method according to claim 13, wherein each of the at least one radials identifies a location within one of the given areas of said centroid, and a proximity of said location to said centroid.

* * * * *